United States Patent
Hosan et al.

(10) Patent No.: US 10,468,943 B2
(45) Date of Patent: Nov. 5, 2019

(54) REMOTE CONTROLLED ELECTRONIC ACTUATION OF A TRIGGER DEVICE FOR A LOCKING GAS SPRING

(71) Applicant: Stabilus GmbH, Koblenz (DE)

(72) Inventors: Hans-Josef Hosan, Koblenz (DE); Mihai-Augustin Vidrean, Koblenz (DE); Ioan-Alexandru Godri, Koblenz (DE); Stefan Gherghe, Koblenz (DE); Emilian Francu, Koblenz (DE)

(73) Assignee: Stabilus GmbH, Koblenz (DE)

( * ) Notice: Subject to any disclaimer, the term of this patent is extended or adjusted under 35 U.S.C. 154(b) by 543 days.

(21) Appl. No.: 15/144,880

(22) Filed: May 3, 2016

(65) Prior Publication Data
US 2016/0327071 A1   Nov. 10, 2016

(30) Foreign Application Priority Data

May 4, 2015 (DE) .......... 10 2015 208 216
Jul. 28, 2015 (DE) .......... 10 2015 214 298

(51) Int. Cl.
*F16F 9/56* (2006.01)
*H02K 7/116* (2006.01)

(52) U.S. Cl.
CPC ............. *H02K 7/116* (2013.01); *F16F 9/56* (2013.01)

(58) Field of Classification Search
CPC ....... A47C 3/30; B60N 2/919; F15B 15/1447; F15B 15/202; H02K 7/116
See application file for complete search history.

(56) References Cited

U.S. PATENT DOCUMENTS

| 4,139,175 A | 2/1979 | Bauer |
| 4,628,541 A * | 12/1986 | Beavers ............... G06F 3/0231 |
| | | 375/309 |
| 5,538,115 A * | 7/1996 | Koch ................... A47C 3/30 |
| | | 188/266.6 |
| 2014/0265419 A1 | 9/2014 | Bennett |

FOREIGN PATENT DOCUMENTS

| DE | 1554216 | 4/1970 |
| DE | 2630483 | 1/1978 |
| DE | 3934960 | 4/1991 |
| DE | 4311625 | 10/1994 |

OTHER PUBLICATIONS

German Search Report dated Mar. 24, 2016.

* cited by examiner

*Primary Examiner* — Abiy Teka
(74) *Attorney, Agent, or Firm* — Rankin, Hill & Clark LLP

(57) ABSTRACT

A trigger device includes an actuation device for converting an electrical activation signal into a movement of an actuator, a control device, which is connected to the actuation device for transmitting an actuation signal and which comprises receiving means for receiving an activation signal, and a power supply unit for supplying the actuation device and the control device with electric power.

17 Claims, 10 Drawing Sheets

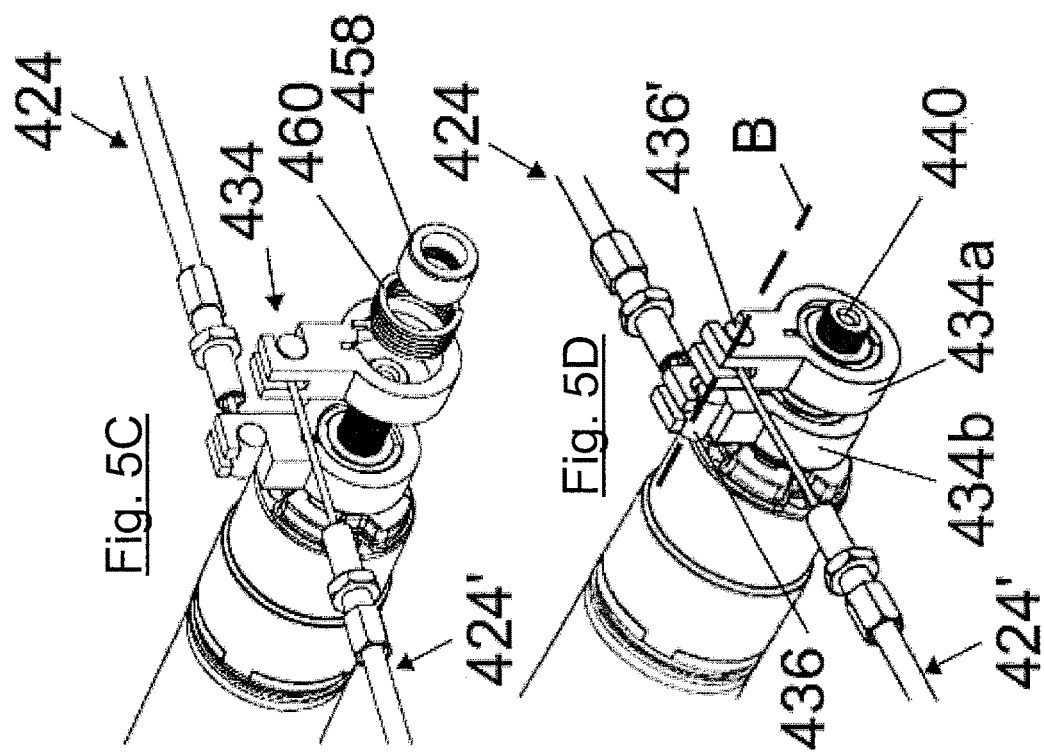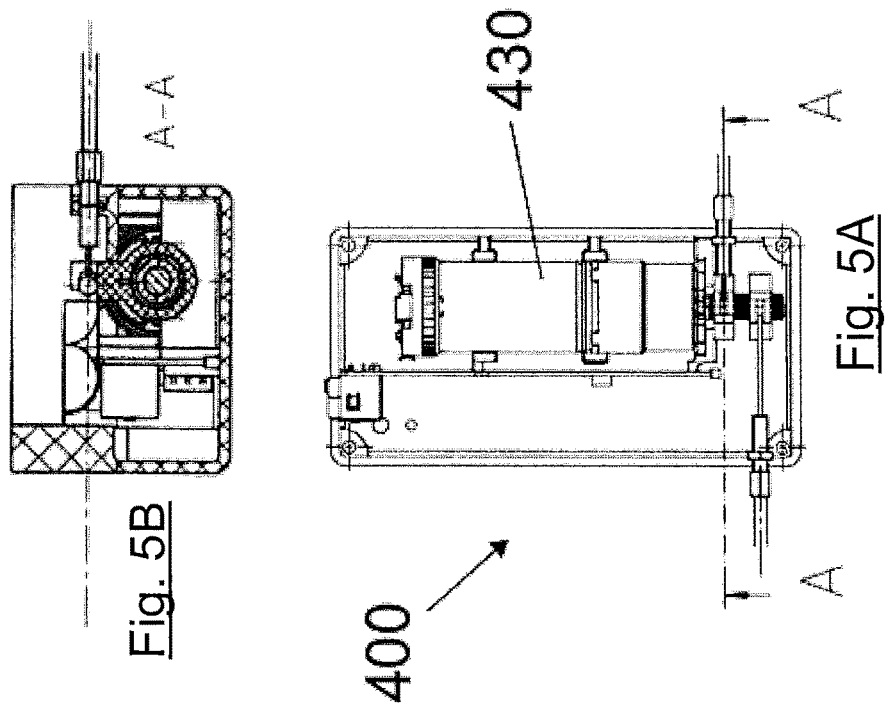

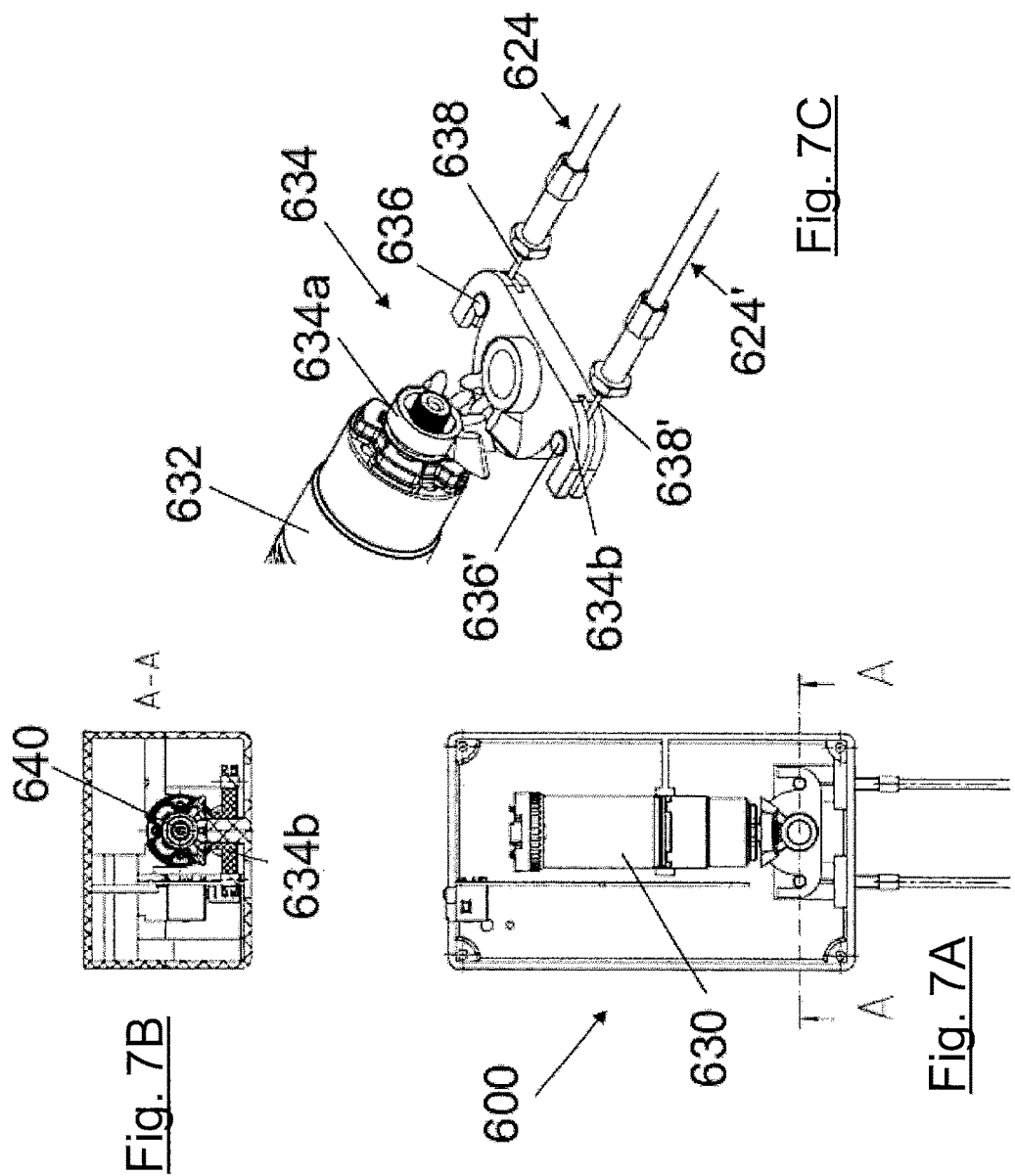

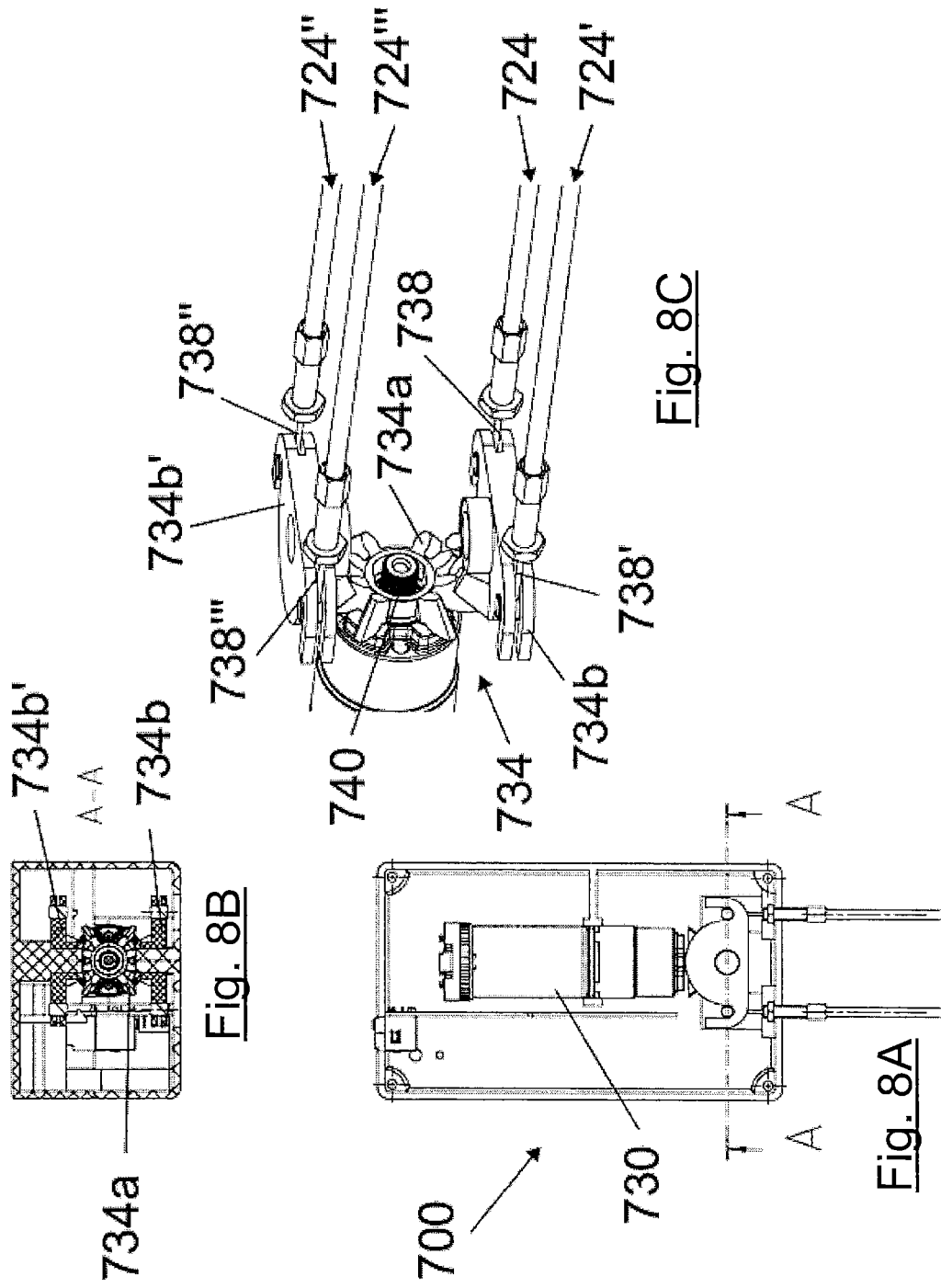

REMOTE CONTROLLED ELECTRONIC ACTUATION OF A TRIGGER DEVICE FOR A LOCKING GAS SPRING

The invention relates to a trigger device and to a piston-cylinder arrangement, which comprises at least one piston-cylinder unit and at least one trigger device according to the invention.

Conventionally, locking piston-cylinder units, such as gas springs, are unlocked by means of a mechanical device, which has to be operated manually. In this case, there is firstly the risk of an operating error of the mechanical unlocking device and thus the risk of damage to the assembly and secondly, a plurality of unlocking mechanisms cannot be actuated simultaneously in a convenient manner due to the manual actuation. Moreover, it can happen that the mechanical unlocking mechanism of a piston-cylinder unit can only be reached with difficulty or even not at all depending on the operating conditions.

A trigger device is known from an earlier patent application by the applicant under the number DE 4 31 16 25 A1, which can actuate the unlocking device of a piston-cylinder unit by means of a motor. The particular focus of this patent application is on the possibility of keeping the unlocking device of the piston-cylinder unit in an unlocked state without further energy input.

DE 39 34 960 A1, which likewise originates from the applicant, discloses an actuation device which actuates an unlocking mechanism for a piston-cylinder unit in a disclosed embodiment by means of an electromagnet.

Furthermore, DE 26 30 483 A1 discloses a lifting system which comprises a pump unit that can change the pressure in a working space filled with hydraulic fluid, so that the seat of a chair, for example, is raised. The lifting system disclosed in this document also comprises a battery and operating units for actuating the lifting system.

It is therefore the object of the present invention to provide a trigger device for a locking piston-cylinder unit which offers improved fields of application.

According to a first aspect, this object is achieved according to the invention by a trigger device comprising an actuation device for converting an electrical actuating signal into a movement of an actuator, a control device which is connected to the actuation device for transmitting an actuating signal and comprises receiving means for receiving an activation signal, and a power supply unit for supplying the actuation device and the control device with electric power.

In particular, the trigger device according to the invention can be provided for a locking piston-cylinder unit, for an electrical drive and/or for a mechanical drive.

The trigger device according to the invention therefore provides the advantage that a locking piston-cylinder unit, for example, can also be unlocked without direct manual actuation of a mechanical unlocking unit, as a result of which high actuating forces can also be generated.

A further advantage of the present invention is that in comparison with trigger devices which are designed for manual actuation, the trigger device according to the invention is more space-saving and robust.

Trigger devices according to the invention for locking piston-cylinder units can, for example, be used in chairs (height adjustment, backrest adjustment, etc.) or in various industrial or medical applications (for example equipment mounting devices).

Advantageously, the control device can be arranged to interrupt or produce a power supply from the power supply unit to the actuation device. In this case, following an establishment of the power supply from the power supply unit to the actuation device, the actuator can be driven such that it either moves around a predetermined path and subsequently stops, or moves further as long as the actuation device is supplied with power. Following an interruption of the power supply from the power supply unit to the actuation device, the actuator can be driven by the actuation device and/or an external force into its starting position (also referred to as "to zero position").

Advantageously, the power supply unit can comprise a battery pack. In this way, the trigger device according to the invention can be operated independently of a connection to a stationary power supply. In particular if the trigger device according to the invention is set up in order to be arranged in a mobile complete system this can be a great advantage. The battery pack can be rechargeable, it being possible to provide a charging port connected to the battery pack for this purpose. Alternatively, or additionally, the battery pack can also be designed to be removable and so it can be recharged in an external charging station. In order to recharge the battery pack without removing it from the trigger device, the battery pack can be connected to a further power supply unit, such as a unit generating power from solar energy and/or a unit generating power from kinetic energy and/or a unit generating power from waste heat and/or a power generating unit based on thermoelectricity (Seebeck effect). Instead of a rechargeable battery pack, a non-rechargeable battery can also be provided, which is advantageously designed to be replaceable. It is, of course, also conceivable to connect the trigger device according to the invention to a stationary power supply unit, such as a domestic power supply, using a cable both to recharge the battery pack and as a direct power supply.

Advantageously, the actuation device can also comprise an electric motor which drives the actuator, advantageously by means of a gear unit. In this case, the gear unit can, for example, convert a high rotational speed of the electric motor, which is, for example, a direct current motor, on the drive side of the gear unit into a high torque on the output side of the gear unit. A typical example of such a gear unit is a planetary gear set. The actuator can be connected for conjoint rotation to an output shaft of the gear unit in order, for example, to be displaced in a rotational manner together with the output shaft of the gear unit in a clockwise or anticlockwise direction. Here, the electric motor can drive the actuator such that the actuator shifts only by a predetermined distance, i.e. in this case by a predetermined angle. This can, for example, be achieved in that the electric motor is only driven until the actuator has shifted by the predetermined distance. A further example could be that a coupling is arranged between the electric motor and the actuator and that the actuator is moved against a stop after covering the predetermined distance, whereupon the coupling, such as a slipping clutch, can be decoupled such that the side of the coupling connected to the electric motor continues to be driven whereas the side of the coupling connected to the actuator remains substantially stationary. Instead of the stop, the coupling can, for example, also disengage when a predetermined resistant force, for example a counteractive spring force, is reached. At the end of an actuation process, the actuator can be shifted, for example by a rotation of an electric motor counter to the initial drive direction and/or by the influence of an external force, into a position in which the actuator was at the beginning of the actuation process.

Alternatively, the actuation device can comprise an electromagnet which drives the actuator, advantageously by means of a translation unit. Here, the actuator can be ferromagnetic at least in part. The actuator can be arranged relative to the electromagnet such that it can be displaced following a supply of power from the electromagnet, for example towards it or away from it. The translation unit can, for example, be a lever device, which can translate the distance by which the actuator is displaced into a longer or shorter distance and into a greater or smaller force in accordance with the lever principle. The displacement of the actuator following a supply of power from the electromagnet can, for example, occur against an external force, such as a spring connected to the actuator, and therefore, following interruption of the power supply from the electromagnet, the actuator can be displaced back into a starting position by said external force.

Advantageously, the receiving means can be set up to wirelessly receive the activation signal. The receiving means can, for example, be constructed as an antenna, which receives the activation signal via, for example, Bluetooth®, W-LAN, infrared or any other suitable radio communication.

According to a second aspect of the present invention, this relates to a piston-cylinder arrangement comprising at least one piston-cylinder unit and at least one trigger device according to the invention, the actuator being connected or connectable to a force transmission element, of which the end opposite the actuator is connected or connectable to at least one unlocking mechanism of the piston-cylinder unit.

The piston-cylinder unit advantageously comprises here a cylinder, which is filled with fluid, and a piston, which divides the cylinder into two working spaces, the piston having at least one through-opening which connects the two working spaces and can be sealed by means of a valve, the actuator switching the valve. Such a valve can have an actuation direction, which extends, for example, radially and/or axially in relation to the piston. An actuation force in the case of an axial type valve can, for example, be from 50 N to 300 N (at a temperature of approximately 20° C.). The actuation distance of an axial type valve can, for example, be from 1 mm to 3 mm. The actuation force of a radial type valve can, for example be from 5 N to 50 N (at approximately 20° C.) and a corresponding actuation distance can, for example, be 1 mm to 3 mm. When the valve is open, the piston can be displaced inside the cylinder.

In a development of the present invention, the transmission element can be a cable pull, in particular a Bowden cable. The Bowden cable can advantageously comprise a cable having two end fittings and an outer sleeve. To use a Bowden cable as a force transmission element, the actuator can advantageously be in the form of a hook and therefore it can have a compatible receptacle for one of the end fittings. Furthermore, the actuator can advantageously be provided with a slot across at least part of the actuator and so the cable of the Bowden cable can be passed through this slot. In this case, the sheathing of the Bowden cable can be supported at a point which remains stationary in relation to a displacement of the actuator (e.g. a housing of the trigger device). It is also conceivable for at least one of the end fittings of the Bowden cable to be attached after an installation of the Bowden cable and so an end fitting receptacle can also be designed without a slot, for example. This can be advantageous in the design, for example of an actuator which is driven by an electromagnet. Instead of the end fitting, the cable of the Bowden cable can also be connected directly to a corresponding receptacle by means of clamps, soldering or a similar connection, for example. Following a displacement of the actuator, the cable of the Bowden cable is thus displaced in relation to the outer sleeve of the Bowden cable. The sheathing of the Bowden cable can also comprise at least one length variation device, such as a screw, by means of which the length of the sheathing can be changed.

Alternatively, the force transmission element can be a rod. In particular in the case in which it is necessary for the force transmission element to be able to transmit force in both displacement directions (for example clockwise and anti-clockwise, and translationally to and fro respectively), the use of a rod as the force transmission element can be advantageous.

Alternatively, the force transmission element can comprise a plurality of cable pulls, in particular Bowden cables, and/or a plurality of rods.

Advantageously, the piston-cylinder arrangement also comprises a transmitter unit which can transmit the activation signal to the control device. Such a transmitter unit can, for example, be constructed in the form of a remote control, which allows a user to send an appropriate activation signal to the control device in a simple manner. In particular, when using a plurality of piston-cylinder units and a plurality of trigger devices, the transmitter unit can comprise a plurality of operating elements and so a user can activate one or more unlocking mechanisms of the piston-cylinder units by using the operating elements. In this case, for example, an actuation unit, such as a button or a touch pad, can actuate the unlocking mechanism or unlocking mechanisms assigned to this actuation unit simultaneously or in sequence, for example also on the basis of a predetermined delay schedule. The operating elements of the transmitter unit can be freely programmable for this purpose.

Advantageously, the transmitter unit can be wirelessly connected or connectable to the control device. This can be achieved, for example, using the same methods of communication as have already been described above in relation to the means of reception of the control device.

Advantageously, the piston-cylinder arrangement, or at least the trigger device according to the invention, can be set up such that it can replace an existing mechanical unlocking device. In this way, existing systems can be retrofitted in a simple manner, for example, using an already available piston-cylinder unit. The example of a chair is mentioned here merely for better understanding of the present invention, in the case of which chair the lever design for actuating the unlocking mechanism of the gas spring, which is, for example, installed in the support column of the chair, can be removed and can be replaced by the trigger device according to the invention. The existing gas spring can therefore continue to be used, which again provides a considerable cost benefit for retrofitting the chair with the trigger device according to the invention. Depending on the construction of the mechanical unlocking device to be retrofitted, an existing force transmission element can continue to be used or, for example, replaced by a Bowden cable. Such chairs are, for example, used in a temperature range from 0° C. to 60° C. In particular compared with a completely electrical lifting device, the present piston-cylinder arrangement and the trigger device according to the invention require considerably less space and expense. The trigger device according to the invention can be arranged here in the region of the seat or the backrest or the pedestal, for example.

In a development of the present invention, the piston-cylinder arrangement and the trigger device can be connected to at least one sensor, which is set up to capture at least one parameter (such as temperature, weight, displacements and the like). The sensor can also be set up to forward the at least one captured parameter in the form of signals and/or values to at least one of the components of the piston-cylinder arrangement according to the invention. For example, the transmitter unit can comprise display means, which can display the values provided by the at least one sensor to a user. It is also conceivable that these signals and/or values can be provided to a predetermined control device or to a central control device, for example, whereupon a corresponding actuation device and therefore an unlocking device of a piston-cylinder unit assigned thereto can be actuated automatically. Such a control device or central control device can, for example, comprise an ECU or a microcontroller or similar.

Advantageously, the plurality of cable pulls and/or rods can be arranged on the actuator such that when the actuator is displaced in a first direction, a first quantity of cable pulls and/or rods actuate respective first unlocking mechanisms and when the actuator is displaced in a second direction, a second quantity of cable pulls and/or rods actuate respective second unlocking mechanisms. The actuator can therefore, for example, actuate a predetermined quantity of trigger mechanisms and piston-cylinder units depending on the displacement direction of the actuator, as a result of which, for example, a backrest and/or seat height locking mechanism can be released in order to change the respective position. An exemplary arrangement of a first and a second cable pull on the actuator can be such that in a first displacement direction of the actuator only the first cable pull is actuated, i.e. in this case pulled, while the second cable pull is not actuated, and in a second displacement direction of the actuator only the second cable pull is actuated, i.e. in this case pulled, while the first cable pull is not actuated.

In a development of the piston-cylinder arrangement, the first quantity of cable pulls and/or rods and the second quantity of cable pulls and/or rods can be equal.

In the following, the invention is described in detail with reference to two embodiments and the accompanying drawings, in which:

FIG. 5A is a schematic plan view of a fifth embodiment of the trigger device according to the invention, which is connected to two Bowden cables;

FIG. 5B is a cross-sectional side view of the fifth embodiment of the trigger device according to the invention shown in FIG. 5A;

FIG. 5C is a perspective view of the fifth embodiment of the trigger device according to FIG. 5A;

FIG. 5D is a perspective exploded view of the fifth embodiment of the trigger device according to the invention shown in FIG. 5C;

FIG. 7A is a schematic plan view of a seventh embodiment of the trigger device according to the invention, which is connected to two Bowden cables;

FIG. 7B is a cross-sectional side view of the seventh embodiment of the trigger device according to the invention shown in FIG. 7A;

FIG. 7C is a perspective view of the seventh embodiment of the trigger device according to the invention shown in FIG. 7A;

FIG. 8A is a schematic plan view of an eighth embodiment of the trigger device according to the invention, which is connected to four Bowden cables;

FIG. 8B is a cross-sectional side view of the eighth embodiment of the trigger device according to the invention shown in FIG. 8A;

FIG. 8C is a perspective view of the eighth embodiment of the trigger device according to the invention shown in FIG. 8A.

Figure 1A:
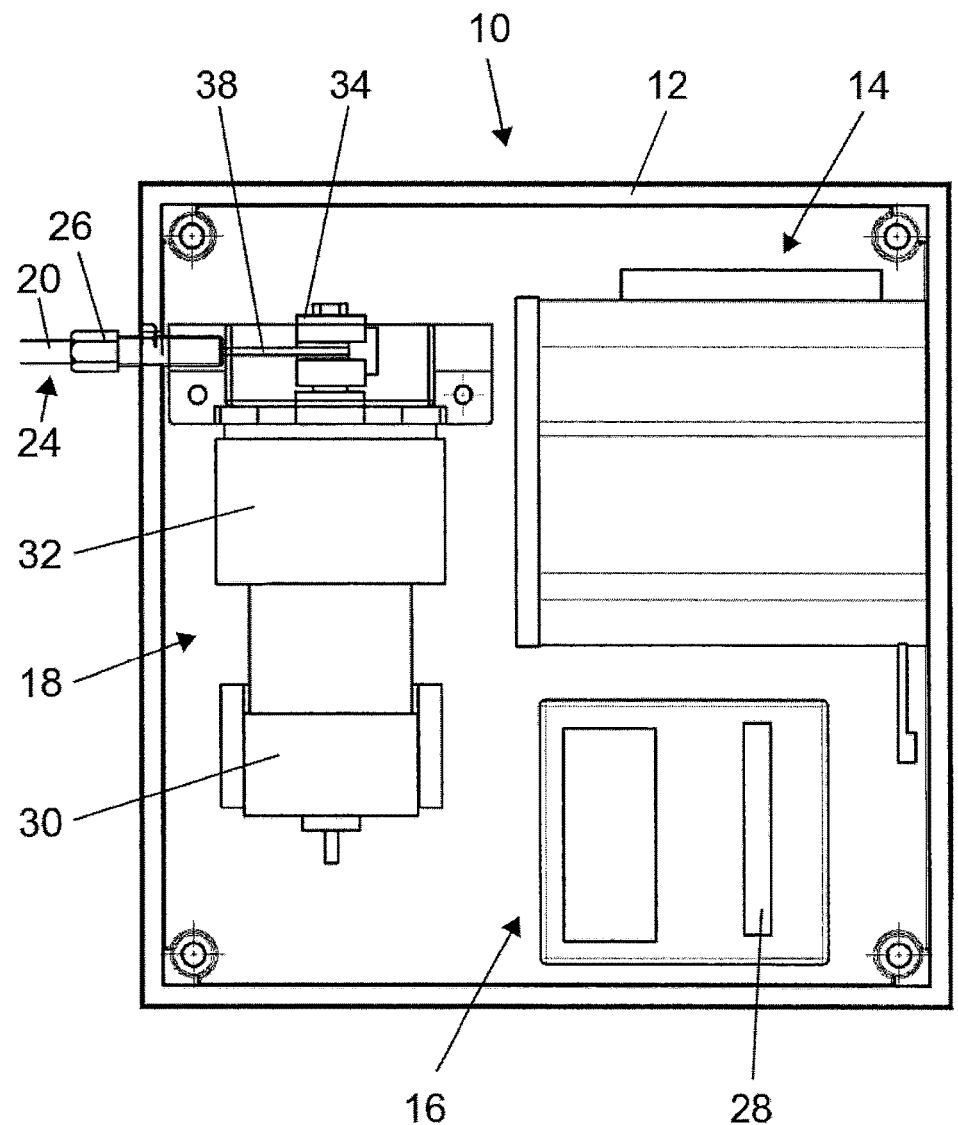
FIG. 1A is a schematic plan view of a first embodiment of a trigger device according to the invention, which is connected to a Bowden cable.

In FIG. 1A, a trigger device is generally denoted by 10. The trigger device 10 comprises a housing 12 which is in the form of a rectangular box in the present embodiment. The housing can, for example, be produced from plastics, metal, a composite material or from any other suitable material. The housing 12 incorporates a battery pack 14, a control device 16 and an actuation device 18, which are described in detail below. Furthermore, a sheath 20 of a Bowden cable 24 is preferably supported on the housing 12 by means of a support screw 26, the support screw 26 being in threaded engagement with the housing 12 in the present example and therefore, following a rotation of the support screw 26, it can be screwed out of the housing or into the housing, as a result of which the free length of the sheath 20 of the Bowden cable 24 can be lengthened or shortened in a known manner. The housing can, for example, be watertight and/or dustproof, which can be expressed by an appropriate IP classification.

The battery pack 14 can, for example, comprise commercially available batteries such as AA batteries or AA rechargeable batteries or an application-specific battery. The battery can be either rechargeable or non-rechargeable and permanently fitted or replaceable as described in detail above, to which reference is expressly made here.

The control device 16 is supplied with electric power by the battery pack 14 and comprises, for example, an ECU.

Furthermore, the control device 16 comprises reception means 28, which are in the form of an antenna in this case. The antenna 28 wirelessly receives an activation signal from an external transmitting unit (not shown). This activation signal is converted by the control device into an actuation signal which is passed on to the actuation device 18.

It should be mentioned at this point that a representation of the electrical connections between the individual components has been omitted and that these electrical connections can be designed in any suitable manner depending on the embodiment, for example they can be provided on a printed circuit board.

In the first embodiment of the trigger device according to the invention, the actuation device 18 comprises an electric motor 30, which is connected to an actuator 34 by means of a gear unit 32. The actuator 34 is connected to an end fitting 36 of a cable 38 of the Bowden cable 24.

Figure 1B:
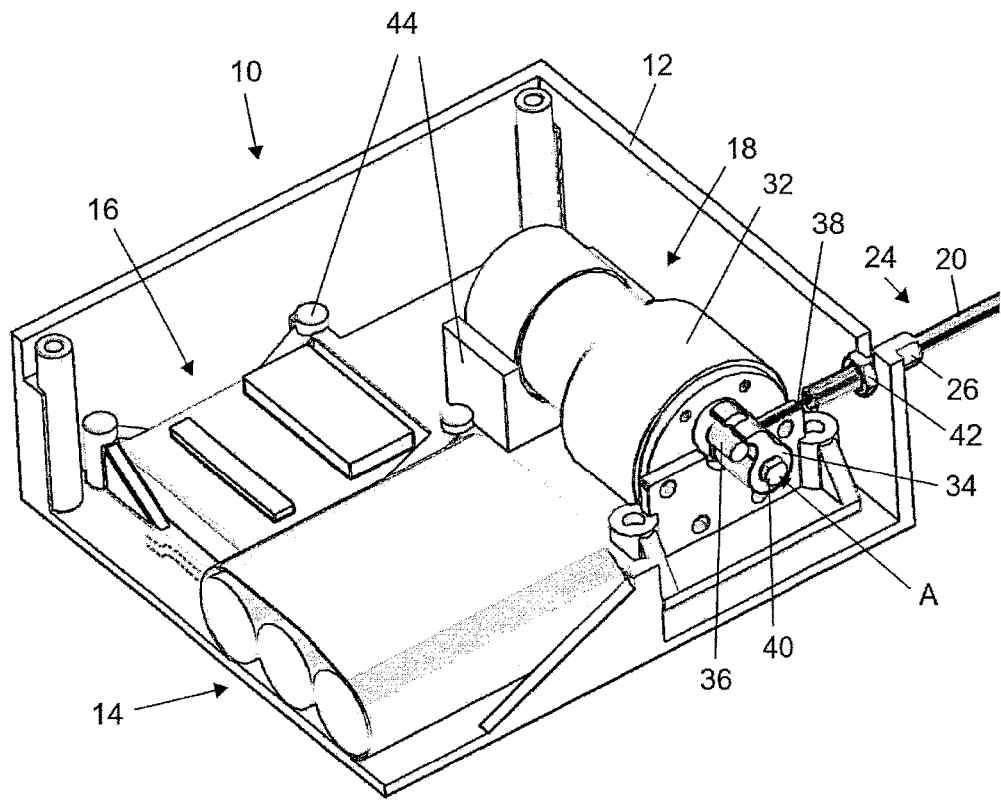
FIG. 1B is a perspective view of the embodiment of the trigger device connected to the Bowden cable shown in FIG. 1A.

As can be seen better from FIG. 1B, the cable 38 leads out of the support screw 26 that projects through the wall of the housing 12 and onwards towards the actuator 34. In this embodiment, the actuator 34 is in the form of a hook in order to provide the end fitting 36 with a corresponding receptacle, which prevents the end fitting 36 being displaced unintentionally relative to the actuator 34. The actuator 34 is connected for conjoint rotation to an output shaft 40 of the gear unit 32. In the present embodiment, the anti-twist protection is achieved by an output shaft 40 of the gear unit 32 that is flattened on one side and a corresponding accommodation of the actuator 34.

If the actuation signal is now forwarded by the control device 16 to the actuation device 18, the electric motor 30 is driven, as a result of which the actuator 34 in turn is rotationally displaced by the gear unit 32. The displacement of the actuator 34 can be performed clockwise or anticlockwise depending on the drive direction of the electric motor 30. In the case, for example, of an anticlockwise displacement of the actuator 34, viewed in the direction of the arrow A (see FIG. 1B), the end fitting 36 is displaced further away from the wall of the housing 12 on which the sheath 20 of the Bowden cable 24 is supported, as a result of which the cable 38 of the Bowden cable 24 is displaced relative to the sheath 20 of the Bowden cable 24 together with the end fitting 36. The actuation signal can, for example, drive the electric motor 30 such that it displaces the actuator 34 and thus the cable 38 of the Bowden cable 24 by a predetermined distance, holds this position for a predetermined time and subsequently moves the actuator 34 together with the end fitting 36 and the cable 38 back into their starting position. Alternatively or additionally, it is possible for the above-described displacement of the cable 38 of the Bowden cable 24 in relation to the outer sheath 20 of the Bowden cable 24 to be performed against an external force, which is applied, for example, at the other end of the cable 38 of the Bowden cable 24, and so the cable 38 of the Bowden cable 24 and thus the actuator 34 is moved back into a starting position by means of this external force as soon as the electric motor 30 is no longer supplied with electric power. Furthermore, it should be pointed out that the actuation device as described above can comprise a coupling.

In FIG. 1B, a nut 42 can also be seen which can be used as a securing device in order to prevent an unintentional rotation of the support screw 26. According to the generally known manner of use of Bowden cables, it is, of course, possible to provide a plurality of nuts without threads on one or both sides of the wall of the housing 12 or the recess in the wall of the housing 12, through which the support screw 26 passes.

In FIGS. 1A and 1B, various fixing devices can be seen which in summary are provided with a reference numeral 44 and which connect corresponding components to the housing 12. Since such fixing devices are generally known, a detailed description of the fixing devices 44 is omitted.

Figure 2A:
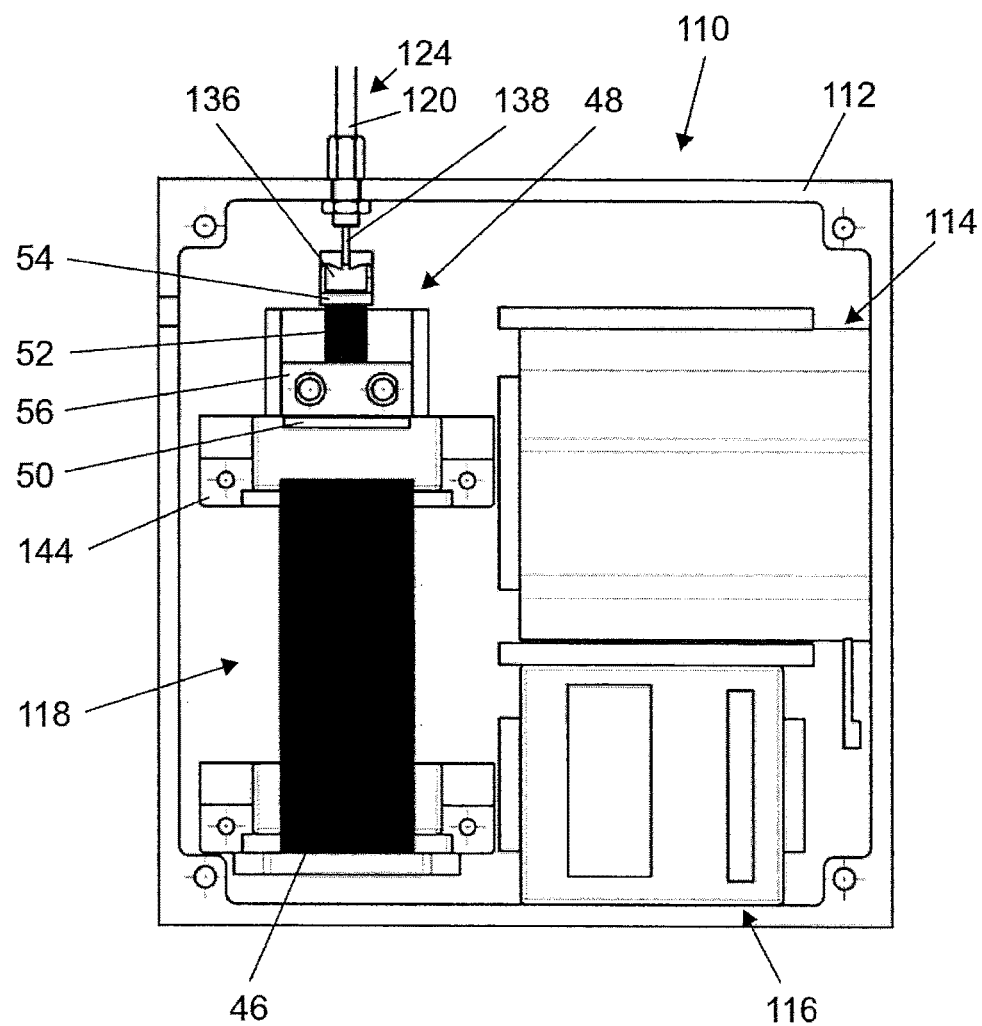
FIG. 2A is a schematic plan view of a second embodiment of the trigger device according to the invention, which is connected to a Bowden cable.
Figure 2B:
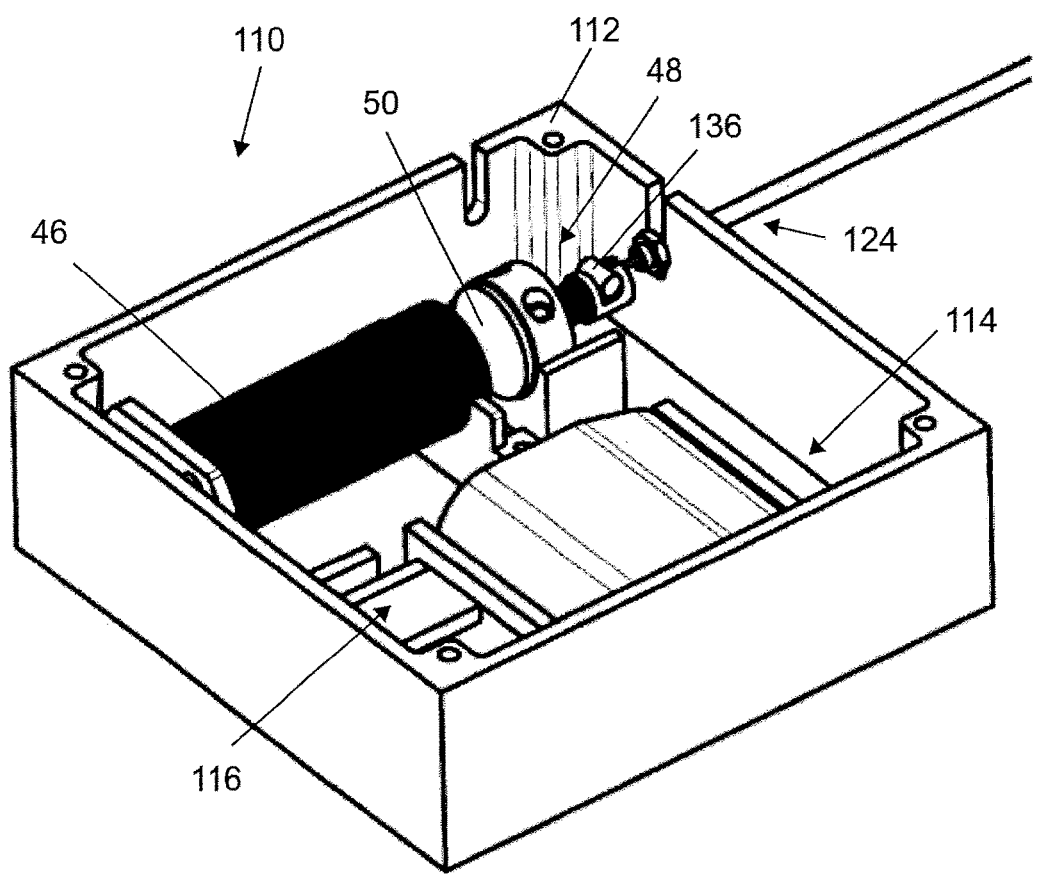
FIG. 2B is a perspective view of the second embodiment of the trigger device according to the invention shown in FIG. 2A.

The second embodiment shown in FIGS. 2A and 2B differs from the first embodiment according to FIGS. 1A and 1B merely in the design of the actuation device. Specifically, the actuation device 118 according to FIGS. 2A and 2B comprises an electromagnet 46 and a corresponding actuator 48 instead of the electric motor 30, the gear unit 32 and the rotationally driven actuator 34. In FIGS. 2A and 2B analogous parts are provided with the same reference numerals as in FIGS. 1A and 1B but increased by the number 100. Therefore, the embodiment in FIGS. 2A and 2B is described in the following only to the extent to which it differs from the embodiment according to FIGS. 1A and 1B, to the description of which reference is hereby otherwise expressly made.

The electromagnet 46 shown in FIG. 2A is advantageously a standard electromagnet, as generally known from prior art. In the direction of action of the electromagnet 46, the actuator 48 is arranged at a distance from the electromagnet. The actuator 48 can comprise a plate 50 formed advantageously from a ferromagnetic material, a rod-like portion 52 and a receiving portion 54 for an end fitting 136 of a Bowden cable 124. The rod-like portion 52 of the actuator 48 is mounted by means of a mounting device 56 so as to be translationally and/or rotationally displaceable. The mounting device 56 can be connected to a housing 112 by means of a fixing device 144.

Following transmission of an activation signal from a control device 116 to the actuation device 118 and following a supply of the electromagnet 46 with electric power from the power supply unit 114, the electromagnet 46 is actuated such that it magnetically attracts the plate 50 of the actuator 48. In this manner, a cable 138 of the Bowden cable 124 that is connected to the actuator 48 by means of the end fitting 136 is displaced in relation to a sheath 120 of the Bowden cable 124. Here, the actuator 48 can be displaced towards the electromagnet 46 until the plate 50 comes into contact with the electromagnet 46 or until, for example, another portion of the actuator 48 comes into contact with a corresponding stop. It is also possible that only a predetermined displacement length can be achieved by the cable 138 of the Bowden cable 124, as a result of which the actuator 48 can reach a final position at a distance from the electromagnet 46 following actuation of the electromagnet 46 even without the provision of stops. After the actuator 48 has been held in this final position for a predetermined time by the action of the electromagnet 46, the power supply to the electromagnet 46 is interrupted and so the actuator 48 is displaced back into its starting position. In the embodiment shown in FIG. 2A, the plate 50 rests on the mounting device 56 in the starting position of the actuator 48. The return displacement of the actuator 48 can be achieved either by an external force, for example against the cable 138, or, for example, by a magnetic force, which displaces the plate 50, and thus the actuator 48, in a direction away from the electromagnet 46. This can also be achieved, for example, in that, when it is not being supplied with power, the electromagnet 46 has a magnetic force which acts in the opposite direction to the magnetic force when it is being supplied with power.

According to a piston-cylinder arrangement according to the second aspect of the present invention, the end (not shown) of the Bowden cable 24, 124 that is illustrated in FIG. 1A to 2B is connected to an unlocking mechanism for locking piston-cylinder units, such as gas springs.

Figure 3C:
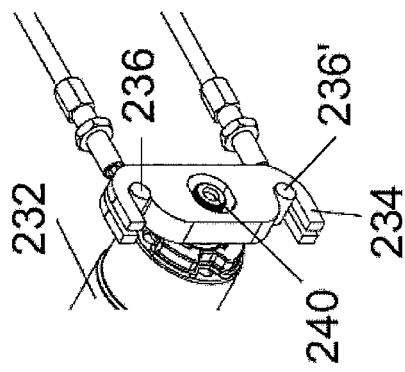
FIG. 3C is a perspective view of the third embodiment of the trigger device according to the invention shown in FIG. 3A.
Figure 3B:
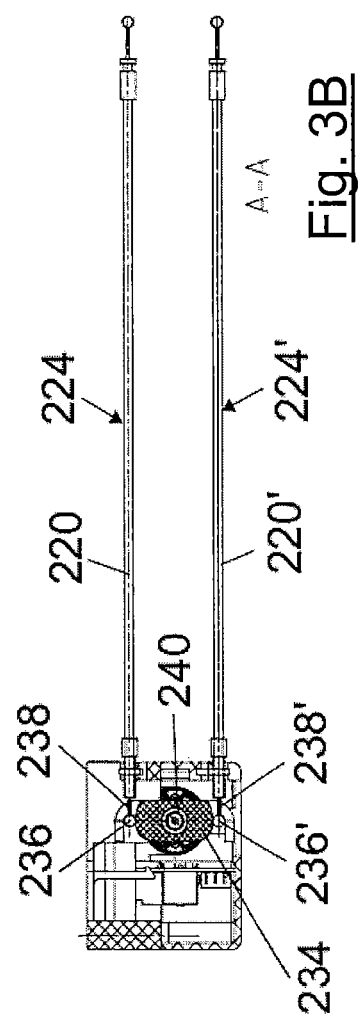
FIG. 3B is a cross-sectional side view of the third embodiment of the trigger device according to the invention shown in FIG. 3A.
Figure 3A:
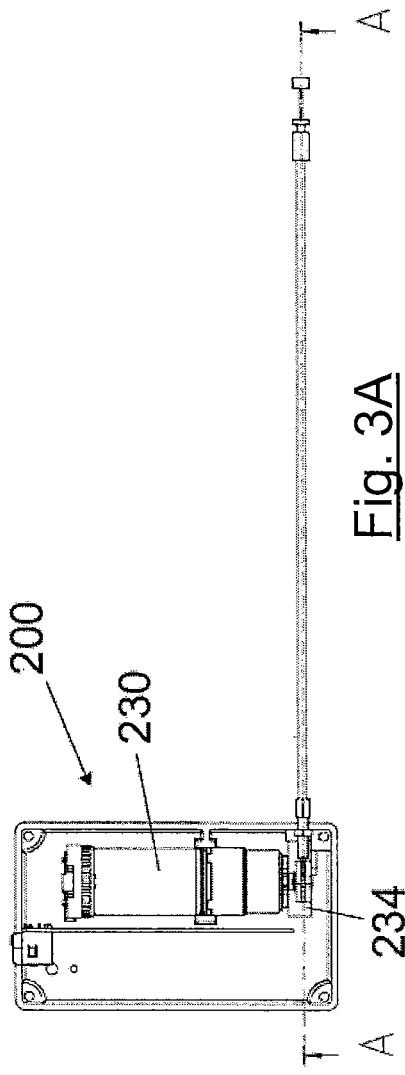
FIG. 3A is a schematic plan view of a third embodiment of the trigger device according to the invention, which is connected to two Bowden cables.

The third embodiment shown in FIG. 3A to 3C differs from the first embodiment according to FIGS. 1A and 1B merely in the design of the actuator. Specifically, the piston-cylinder arrangement 200 according to FIG. 3A to 3C comprises an integral actuator 234, which is arranged for connection to two Bowden cables 224, 224' instead of the actuator 34, which is arranged for connection to one Bowden cable. In FIG. 3A to 3C, analogous parts are provided with the same reference numerals as in FIGS. 1A and 1B, but increased by the number 200. The embodiment in FIG. 3A to 3C is described in the following only to the extent to which it differs from the embodiment according to FIG. 1A to 2B, to which description reference is otherwise expressly made here.

The two Bowden cables 224, 224' are arranged on the actuator 234 such that a clockwise rotation of the actuator 234, viewed in the direction of the arrow A in FIG. 3A, brings about a leftward displacement of a cable pull 238' relative to a sheath 220' and a rightward displacement of a cable pull 238 relative to an outer sleeve 220. Alternatively, displacement of the cable pull 238 cannot take place during the rotation of the actuator described above. Instead, for example, an end fitting 236 of the cable pull 238 can disengage from the actuator 234. The same applies, of course, to an anticlockwise rotation, for example with respect to the end fitting 236'.

In this embodiment, the actuator 234 is held for conjoint rotation, by means of a toothing system, on an output shaft 240 which is connected to an electric motor 230, if appropriate with the interconnection of a gear unit.

The displacement of the actuator 234, and thus the displacement of the cable pulls 238, 238', for example following a reciprocating rotation of the output shaft 240, can be described as rocker-like.

Alternatively to the aforementioned toothing system between the actuator 234 and the output shaft 240, a coupling device can also be provided between these two elements. As can be seen in FIG. 5D, a ring 458 can be provided, for example on an output shaft 440, the inside of which ring is engaged with a toothing system of the output shaft 440 and accommodates on its exterior what is known as a wrap spring 460, which, for example, is helical. The inner diameter of the wrap spring 460 in its relaxed state is smaller than the outer diameter of the ring 458. On its exterior, the wrap spring 460 has at least one protrusion, which is engaged in a corresponding recess of an element arranged radially adjacent thereto, such as the actuator 234 or the component 434a, which can be engaged with at least one cable pull. Due to the clamping action between the wrap spring 460 and the ring 458, the wrap spring 460 and the element that is engaged therewith by means of the at least one protrusion is displaced according to the direction of rotation of the output shaft 440 following a rotation of the output shaft 440, and thus of the ring 458. A coupling force can be defined by a predetermined fit between the wrap spring 458 and the ring 460. Advantageously, the winding of the wrap spring is designed such that during a displacement of the wrap spring, the element engaged therewith by means of the at least one protrusion and at least one cable pull arranged thereon into a final position, for example of the cable pull, a continuing rotation of the output shaft 440 and of the ring 458 exerts a torsional force on the wrap spring 460 and so the diameter of the wrap spring 460 is enlarged and thus the coupling action between the wrap spring 460 and the ring 458 is greatly reduced or completely stopped.

Figure 4C:
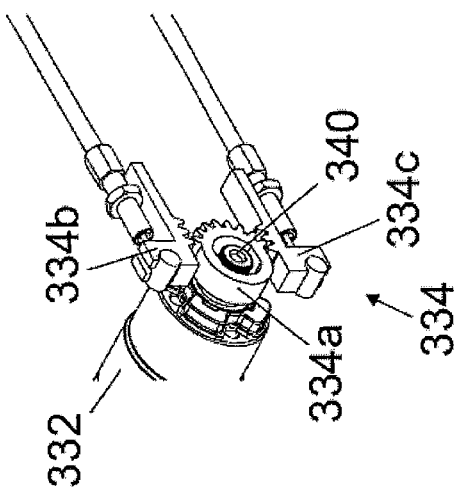
FIG. 4C is a perspective view of the fourth embodiment of the trigger device according to the invention shown in FIG. 4A.
Figure 4B:
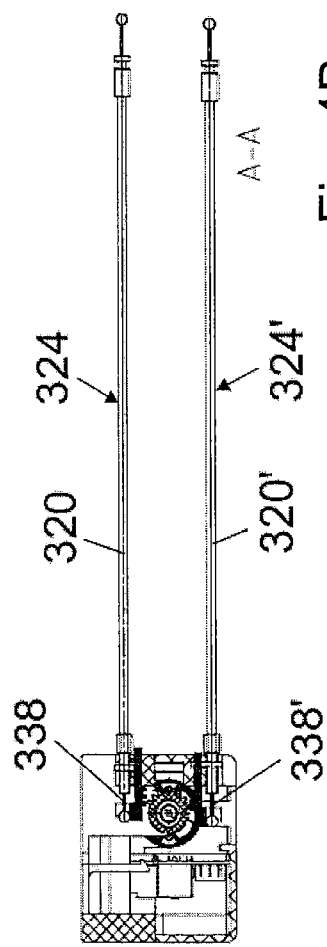
FIG. 4B is a cross-sectional side view of the fourth embodiment of the trigger device according to the invention shown in FIG. 4A.
Figure 4A:
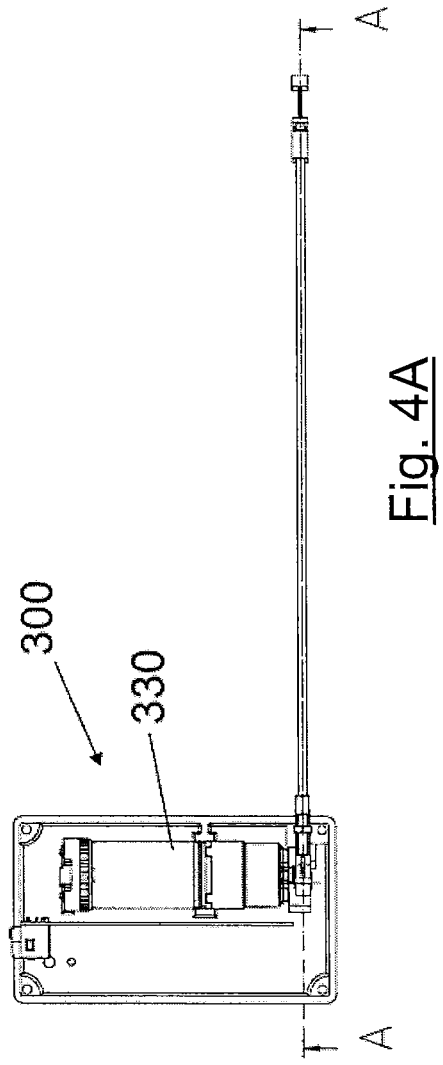
FIG. 4A is a schematic plan view of a fourth embodiment of the trigger device according to the invention, which is connected to two Bowden cables.

The fourth embodiment shown in FIG. 4A to 4C differs from the third embodiment according to FIG. 3A to 3C simply in the design of the actuator. Specifically, the piston-cylinder arrangement 300 according to FIG. 4A to 4C comprises an actuator 334 which comprises a plurality of components, instead of the actuator 234 which is designed as an integral component. In FIG. 4A to 4C analogous parts are provided with the same reference numerals as in FIG. 3A to 3C but increased by the number 100. Therefore the embodiment in FIG. 4A to 4C is described in the following only to the extent to which it differs from the embodiment according to FIG. 1A to 3C to which description reference is otherwise expressly made here.

A central pinion gear 334a of the actuator 334 is held for conjoint rotation, by means of a toothing system, on an output shaft 340 which is connected to an electric motor 330, if appropriate with the interconnection of a gear unit. The outer circumference of the pinion gear 334a is at least partially toothed. The toothing system on the outer circumference of the pinion gear 334a engages with two toothed racks 334b, 334c of the actuator 334, which in turn each engage with end fittings 336, 336' which are connected to cable pulls 338, 338' of Bowden cables 324, 324'.

The two toothed racks 334a, 334b in this embodiment are mounted by way of example in a housing 312 as can be seen in FIG. 4B.

As can also be seen in FIG. 4B, the two cable pulls 338, 338' are designed as Bowden cables 324, 324' and are arranged on opposite sides relative to the output shaft 340.

The fifth embodiment shown in FIG. 5A to 5D differs from the fourth embodiment according to FIG. 4A to 4C merely in the design of the actuator. Specifically, the piston-cylinder arrangement 400 according to FIG. 5A to 5D comprises an actuator 434, which provides an arrangement of two Bowden cables 424, 424' on the same side relative to an output shaft 440, instead of the actuator 334, which provides an arrangement of two Bowden cables on opposite sides relative to an output shaft. In FIG. 5A to 5D analogous parts are provided with the same reference numerals as in FIG. 4A to 4C, but increased by the number 100. Therefore the embodiment in FIG. 5A to 5D is described in the following only to the extent to which it differs from the embodiment according to FIG. 1A to 4C, to the description of which reference is hereby otherwise expressly made.

Two components 434a, 434b of the actuator 434 are connected for conjoint rotation to the output shaft 440 which, as already known from the embodiments 200 and 300, has a toothed system.

In the example shown here, the two components 434a, 434b are designed as identical components that are connected to the output shaft 440 in an opposed manner to one another such that each of the components 434a, 434b is engaged with one end fitting 436, 436' in each case, the two Bowden cables 424, 424' extending away from the actuator 434 in opposite directions.

Furthermore, it can be seen from FIG. 5C that the two components 434a, 434b are connected to the output shaft 440 such that the two end fittings 436, 436' are on the same axis B which is parallel to a longitudinal extension direction of the output shaft 440.

The components 434a, 434b can, of course, also be components that are not identical to one another and/or can be connected to the output shaft 440 in a manner different from the manner described above.

In this case, the two components can, for example, be held in a predetermined position on the output shaft 440 by spacers and/or securing elements.

In this embodiment, the coupling device described above can be provided for just one of the components 434a, 434b or for both components 434a, 434b separately or collectively.

Figure 6C:
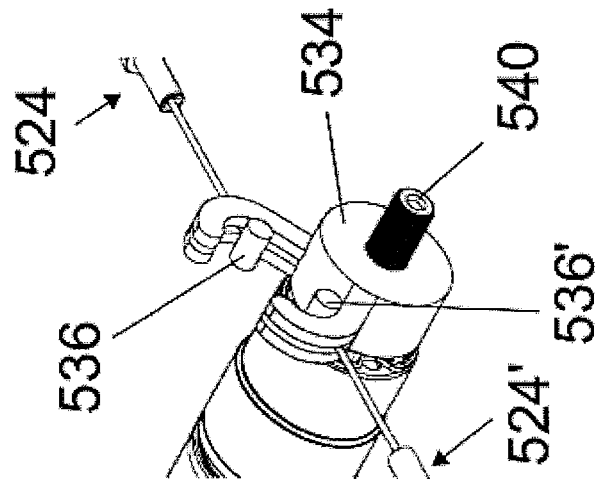
FIG. 6C is a perspective view of the sixth embodiment of the trigger device according to the invention shown in FIG. 6A.
Figure 6B:
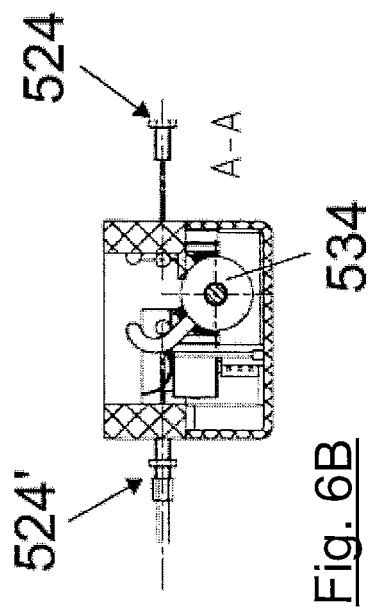
FIG. 6B is a cross-sectional side view of the sixth embodiment of the trigger device according to the invention shown in FIG. 6A.
Figure 6A:
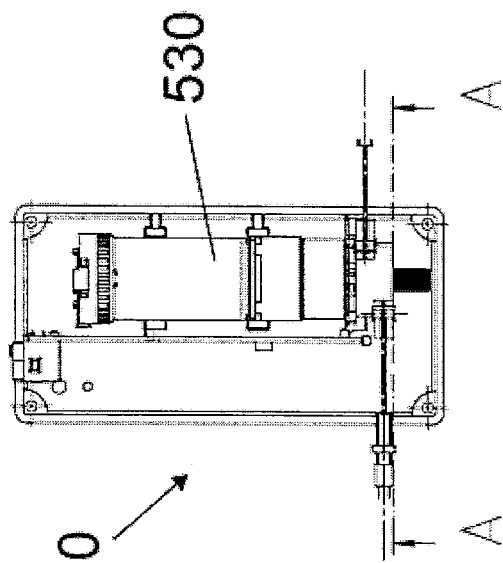
FIG. 6A is a schematic plan view of a sixth embodiment of the trigger device according to the invention, which is connected to two Bowden cables.

The sixth embodiment shown in FIG. 6A to 6C differs from the fifth embodiment according to FIG. 5A to 5D merely in the design of the actuator. Specifically, the piston-cylinder arrangement 500 according to FIG. 6A to 6C has an actuator 534 which is formed integrally, instead of the actuator 434 which comprises a plurality of components. In FIG. 6A to 6C analogous parts are provided with the same reference numerals as in FIG. 5A to 5D, but increased by the number 100. Therefore the embodiment in FIG. 6A to 6C is described in the following only to the extent to which it differs from the embodiment according to FIG. 1A to 5D, to the description of which reference is hereby otherwise expressly made.

The components 434a, 434b known from the piston-cylinder arrangement 400 are combined in the piston-cylinder arrangement 500 to form an actuator 534.

The actuator 534 comprises two hook-shaped elements which are engaged with corresponding end fittings 536, 536'.

In the example shown for example in FIG. 6C, the two hook-shaped elements are offset from one another, viewed relative to a longitudinal extension direction of an output shaft 540. The two hook-shaped elements could, of course, also be arranged at the same height relative to the longitudinal extension direction of the output shaft 540.

The seventh embodiment shown in FIG. 7A to 7C differs from the sixth embodiment according to FIG. 6A to 6C merely in the design of the actuator. Specifically, the piston-cylinder arrangement 600 according to FIG. 7A to 7C has an actuator 634 which fundamentally comprises a pinion gear 634a and a rocker 634b, instead of the actuator 534 which is formed integrally. In FIG. 7A to 7C analogous parts are provided with the same reference numerals as in FIG. 6A to 6C, but increased by the number 100. Therefore the embodiment in FIG. 7A to 7C is described in the following only to the extent to which it differs from the embodiment according to FIG. 1A to 6C, to the description of which reference is hereby otherwise expressly made.

The rocker 634b is engaged with two Bowden cables 624, 624', a respective end fitting 636, 636' of the Bowden cables 624, 624' being accommodated in a corresponding hook-shaped recess of the rocker 434b. The rocker 634b is rotatably mounted approximately in the centre between the two hook-shaped recesses. In order to achieve a differing displacement distance of the two Bowden cables 624, 624' during a displacement of the rocker 634b, the rocker can alternatively also be rotatably mounted at a point which is different from the central point between the two hook-shaped recesses.

The pinion gear 634a, which has a toothing system on at least part of its outer circumference, and the rocker 634b, which has a corresponding counter-toothing system in relation to the external toothing of the pinion gear 634a, engage with one another by means of these toothing systems, and so a rotation of the pinion gear 634a brings about an displacement of the rocker 634b.

The basic displacement of the rocker and thus of the cable pulls 638, 638' of the two Bowden cables 624, 624' is comparable with the type of displacement known from the third embodiment according to FIG. 3A to 3C. The effective direction of the actuator 634, i.e. the plane in which the rocker 634b is displaced, deviates, however, by 90° from the effective direction of the actuator 243, i.e. the plane in which the actuator 234 is displaced.

The eighth embodiment shown in FIG. 8A to 8C differs from the seventh embodiment according to FIG. 7A to 7C merely in the design of the actuator. Specifically, the piston-cylinder arrangement 700 according to FIG. 8A to 8C has an actuator 734 which fundamentally comprises one pinion gear 734a and two rockers 734b, 734b', instead of the actuator 634 which comprises one pinion gear 634a and one rocker 634b. In FIG. 8A to 8C analogous parts are provided with the same reference numerals as in FIG. 7A to 7C, but increased by the number 100. Therefore the embodiment in FIG. 8A to 8C is described in the following only to the extent to which it differs from the embodiment according to FIG. 1A to 7C, to the description of which reference is hereby otherwise expressly made.

The piston-cylinder arrangement 700 comprises fundamentally all of the elements of the piston-cylinder arrangement 600, the piston-cylinder arrangement 700 also comprising on the opposite side to the rocker 734b relative to an output shaft 740 a rocker 734b' which in turn is connected to two Bowden cables 724", 724'".

The pinion gear 734a has a toothing system on at least part of its outer circumference and engages by means thereof with the toothing systems provided on the two rockers 734b, 734b'.

Following a rotation of the pinion gear 734a, the rocker 734b', and thus the cable pulls 738", 738'" of the Bowden cables 724", 724'", is displaced in a manner analogously opposed to the rocker 734b. For the example of a clockwise rotation of the pinion gear 734a, viewed in the direction of the arrow A from FIG. 8A, this means that the two rockers 734b, 734b' are displaced such that the two cable pulls 738, 738'" are pulled.

The rocker 734b' can be mounted in an analogous manner to the mounting of the rocker 634b'.

The invention claimed is:

1. A piston-cylinder arrangement comprising:
    a piston-cylinder unit including
        at least one unlocking mechanism;
    a trigger device including
        an actuation device for converting an electrical actuation signal into a movement of an actuator;
        a control device connected to the actuation device for transmitting an actuation signal and including receiving means for receiving an activation signal;
        a power supply unit for supplying the actuation device and the control device with electric power;
    wherein the actuator is connected or connectable to a force transmission element, which is connected or connectable at its end opposite the actuator to the at least one unlocking mechanism of the piston-cylinder unit,
    wherein the force transmission element comprises a plurality of cable pulls and/or a plurality of rods,
    wherein the plurality of cable pulls and/or rods are arranged on the actuator such that during a displacement of the actuator in a first direction, a first quantity of cable pulls and/or rods activates respective first unlocking mechanisms and during a displacement of the actuator in a second direction, a second quantity of cable pulls and/or rods activates respective second unlocking mechanisms.

2. The piston-cylinder arrangement according to claim 1, wherein the control device is set up to interrupt or produce a power supply from the power supply unit to the actuation device.

3. The piston-cylinder arrangement according to claim 1, wherein the power supply unit comprises a battery pack.

4. The piston-cylinder arrangement according to claim 1, wherein the actuation device comprises an electric motor which drives the actuator by a gear unit.

5. The piston-cylinder arrangement according to claim 1, wherein the actuation device comprises an electromagnet which drives the actuator by a translation device.

6. The piston-cylinder arrangement according to claim 1, wherein the actuator is connected or connectable to a force transmission element, which is connected or connectable at its end opposite the actuator to at least one unlocking mechanism of the piston-cylinder unit.

7. The piston-cylinder arrangement according to claim 6, the piston-cylinder unit comprising:
a cylinder, which is filled with fluid, and
a piston, which divides the cylinder into two working spaces, wherein the piston has at least one through-opening which connects the two working spaces, the at least one through-opening being selectively sealed by a valve, wherein the actuator switches the valve.

8. The piston-cylinder arrangement according to claim 1, further comprising a transmitter unit, which transmits the activation signal to the control device.

9. The piston-cylinder arrangement according to claim 8, wherein the transmitter unit is wirelessly connected or connectable to the control device.

10. The piston-cylinder arrangement according to claim 1, wherein the first quantity of cable pulls and/or rods and the second quantity of cable pulls and/or rods are the same.

11. The piston-cylinder arrangement according to claim 1, wherein the receiving means is set up for wireless reception of the activation signal.

12. A trigger device comprising
an actuation device configured to convert an electrical actuation signal into a movement of an actuator;
a control device connected to the actuation device, the control device configured to transmit an actuation signal and including a receiver for receiving an activation signal;
a power supply unit in electrical communication with the actuation device and the control device; and
a plurality of cable pulls and/or rods arranged on the actuator such that during a displacement of the actuator in a first direction, a first quantity of cable pulls and/or rods are configured to activate a first unlocking mechanism of at least one associated piston-cylinder unit and during a displacement of the actuator in a second direction, a second quantity of cable pulls and/or rods activates respective a second unlocking mechanism of the at least one associated piston-cylinder unit.

13. The trigger device according to claim 12, wherein the receiver is set up for wireless reception of the activation signal.

14. The trigger device according to claim 12, wherein the control device is set up to interrupt or produce a power supply from the power supply unit to the actuation device.

15. The trigger device according to claim 12, wherein the power supply unit comprises a battery pack.

16. The trigger device according to claim 12, wherein the actuation device comprises an electric motor which drives the actuator by a gear unit.

17. The trigger device according to claim 12, wherein the actuation device comprises an electromagnet which drives the actuator by a translation device.

* * * * *